United States Patent [19]

Greene

[11] 4,345,866

[45] Aug. 24, 1982

[54] LOADER-UNLOADER SYSTEM FOR WORK PIECES

[75] Inventor: Larry D. Greene, Centralia, Ill.

[73] Assignee: Acco Industries Inc., Bridgeport, Conn.

[21] Appl. No.: 123,496

[22] Filed: Feb. 22, 1980

[51] Int. Cl.³ .............................................. B23B 13/00
[52] U.S. Cl. .................................... 414/224; 414/225; 414/728; 414/741; 294/86 R; 294/88
[58] Field of Search ............................ 29/568; 82/2.5; 294/67 BB, 103 R, 86 R, 88, DIG. 2; 414/222, 224, 225, 728, 732, 735, 738, 741

[56] References Cited

U.S. PATENT DOCUMENTS

| | | | |
|---|---|---|---|
| 2,226,789 | 12/1940 | Tupy | 294/DIG. 2 |
| 2,803,489 | 8/1957 | Zito | 294/103 |
| 2,874,990 | 2/1959 | Janoff | 294/67 BB X |
| 2,978,117 | 4/1961 | Thompson | 414/224 |
| 3,124,257 | 3/1964 | Price et al. | 414/728 X |
| 3,248,145 | 4/1966 | Diamond | 294/86 R |
| 3,287,057 | 11/1966 | Gallapoo | 294/86 R X |
| 3,575,302 | 4/1971 | Cafolla | 414/732 |
| 3,858,735 | 1/1975 | Zrostlik | 294/103 R X |
| 3,874,525 | 4/1975 | Hassan | 414/225 |
| 4,061,062 | 12/1977 | Peltier | 414/728 X |

FOREIGN PATENT DOCUMENTS 2254784  5/1973  Fed. Rep. of Germany .... 294/86 R

*Primary Examiner*—Trygve M. Blix
*Assistant Examiner*—Terrance L. Siemens
*Attorney, Agent, or Firm*—Barnes, Kisselle, Raisch & Choate

[57] ABSTRACT

A loader-unloader system for loading and unloading workpieces, into a machine tool wherein each workpiece is held in position for rotation about a longitudinal axis during which various machine operations may be performed. The tool comprising a loading chute or conveyor adapted to deliver articles in succession to a loading position, an unloading chute or conveyor adapted to receive workpieces, and a loader-unloader assembly. The loader-unloader assembly comprises a track extending along an axis parallel to the longitudinal axis of the machine, a trolley movable along the track and means for moving said trolley back and forth along the said track. A loader clamping head assembly is mounted on the trolley, and an unloader head assembly is mounted on the trolley. Each assembly includes a head for gripping a workpiece, means on the trolley for mounting said head for swinging movement into and out of position adjacent the machine and for reciprocating movement toward and away from the axis of said machine. Each assembly includes fingers on each head that are movable in a linear path toward and away from one another to grip and release a workpiece. One of the assemblies has a head rotatable to remove a workpiece from the machine, rotate it 180° and return the workpiece to the machine for further machining.

14 Claims, 6 Drawing Figures

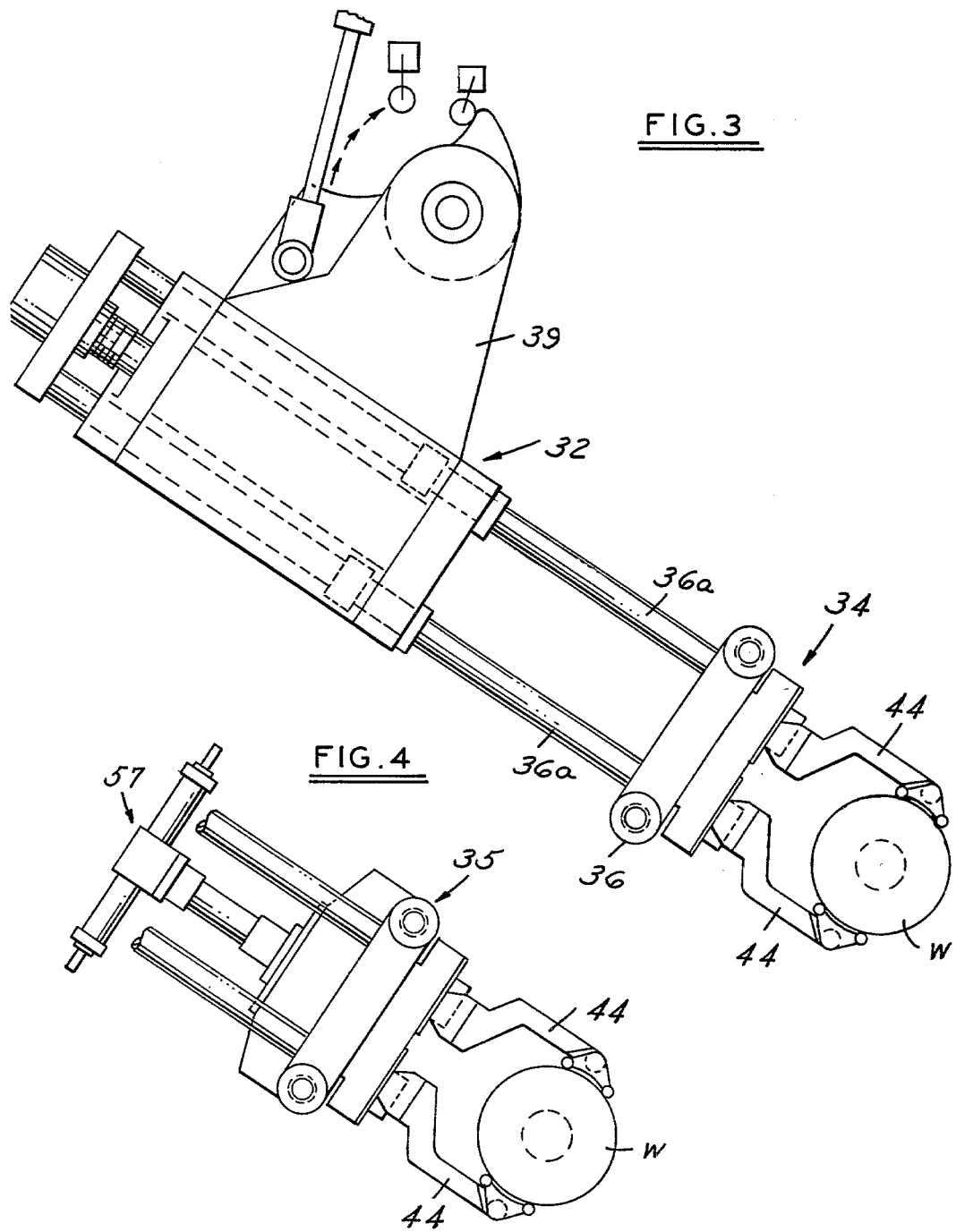

LOADER-UNLOADER SYSTEM FOR WORK PIECES

This invention relates to the loading and unloading of parts into a machine tool such as a lathe.

BACKGROUND AND SUMMARY OF THE INVENTION

It has been heretofore proposed that loading and unloading mechanisms be provided for placing and removing workpieces on a machine tool such as the chuck of a lathe so that various functions can be performed on the workpiece and thereafter unloading the workpiece.

In one type of mechanism heretofore used, mechanical clamping arms are pivotally mounted and movable toward and away from the workpiece to grip and release the workpiece. A problem with such mechanisms is that if the diameter of the workpiece changes, the position of the centerline of the workpiece changes.

Accordingly, the present invention is directed to a loading and unloading system that obviates this problem.

In accordance with the invention, a loader-unloader system is provided for loading and unloading workpieces in a machine tool wherein each workpiece is held in position for rotation about a longitudinal axis during which various machine operations may be performed on the tool. The system comprises a loading chute adapted to deliver articles in succession to a loading position and an unloading chute adapted to receive workpieces. A loader-unloader assembly is provided adjacent the chutes and comprises a track extending along an axis parallel to the longitudinal axis of the machine, a trolley movable along the track means, and means for moving the trolley back and forth along the track means. A loader clamping head assembly is mounted on the trolley, and an unloader head assembly is mounted on the trolley. Each assembly includes a head for gripping a workpiece and is mounted on the trolley for swinging movement into and out of position adjacent the machine tool and for reciprocating movement toward and away from the axis of the machine tool. Each assembly includes fingers on each head that are movable in a linear path toward and away from one another to grip and release a workpiece. One of the assemblies has a head rotatable to remove a workpiece from the machine, rotate it 180° and return the workpiece to the machine for further machining.

BRIEF DESCRIPTION OF THE DRAWINGS

FIG. 3 is a fragmentary view similar to FIG. 2 showing the parts in a different operative position.

FIG. 4 is a fragmentary view similar to FIG. 3 of the unloading head.

DESCRIPTION

Figure 1:
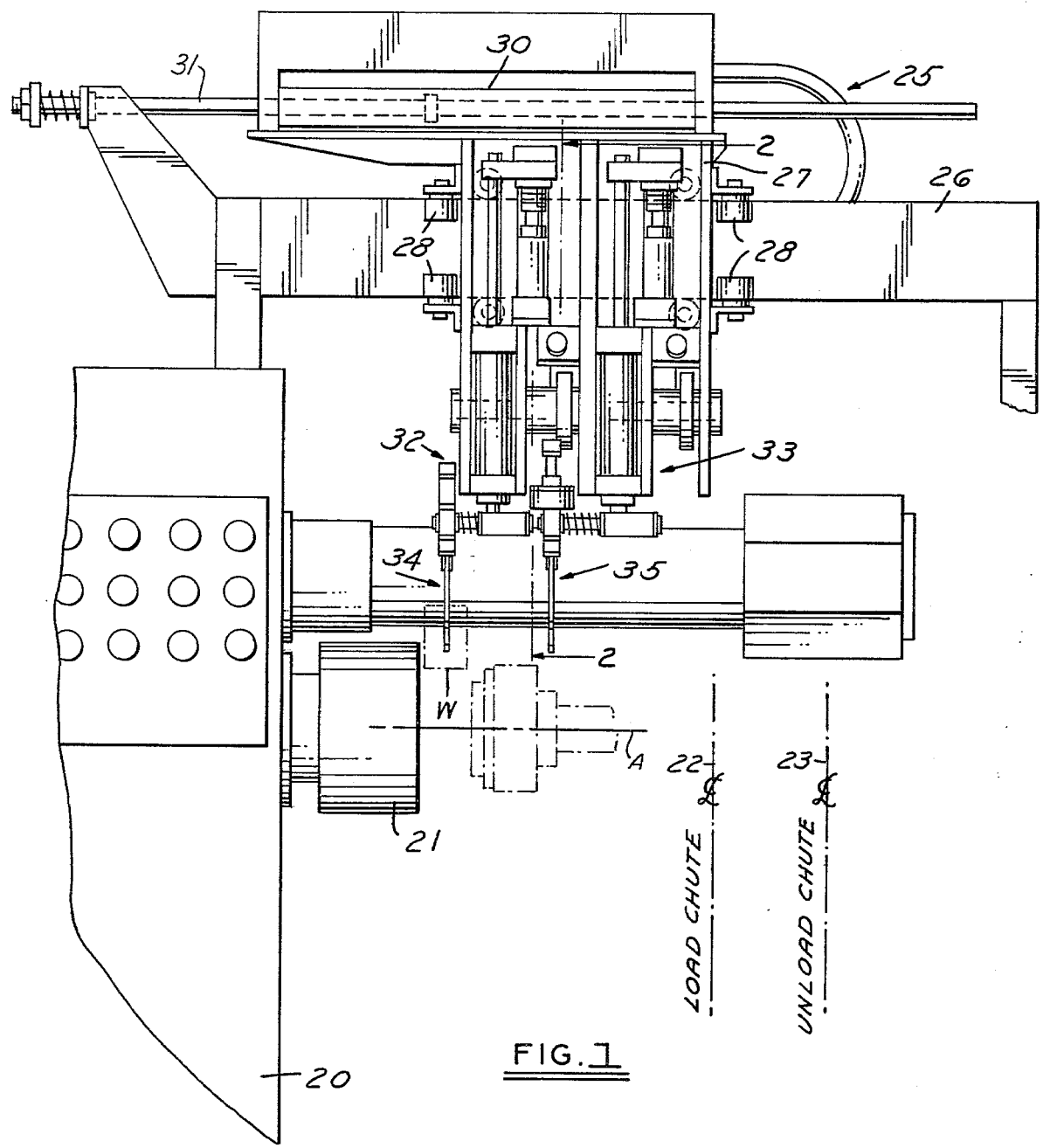
FIG. 1 is a fragmentary part sectional elevational view of a loading and unloading system embodying the invention.

Referring to FIG. 1 the loading and unloading system embodying the invention is shown in connection with a machine tool 20 such as a lathe which has a chuck 21 adapted to support workpieces W.

The system includes a conventional loading chute 22 from which the workpieces are picked up and placed in the lathe and a conventional unloading or receiving chute 23 which receives the workpieces from the lathe.

As further shown in FIG. 1 the loading and unloading assembly 25 comprises a beam 26 that defines a track on which a trolley 27 having wheels 28, 29 (FIG. 2) is mounted for movement parallel to the axis A of the machine and chuck. A piston motor 30 is mounted on the frame and operates on a shaft 31 supported on the beam 26 to reciprocate the trolley parallel to the axis A along the beam.

A loader head assembly 32 and an unloader head assembly 33 are mounted on the trolley 27 and each supports a loading head 34 and unloading head 35 respectively. As shown in FIG. 1, each head 34, 35 is resiliently mounted by spring loaded shock absorbers for movement along the axis of the chuck in order that shock of engagement with the chuck is absorbed.

In addition, as presently described, each head 34, 35 can be pivoted as shown by the arrow B about an axis C and reciprocated as shown by the arrow D to move the head into and out of alignment with the axis A of the chuck 21.

Figure 2:
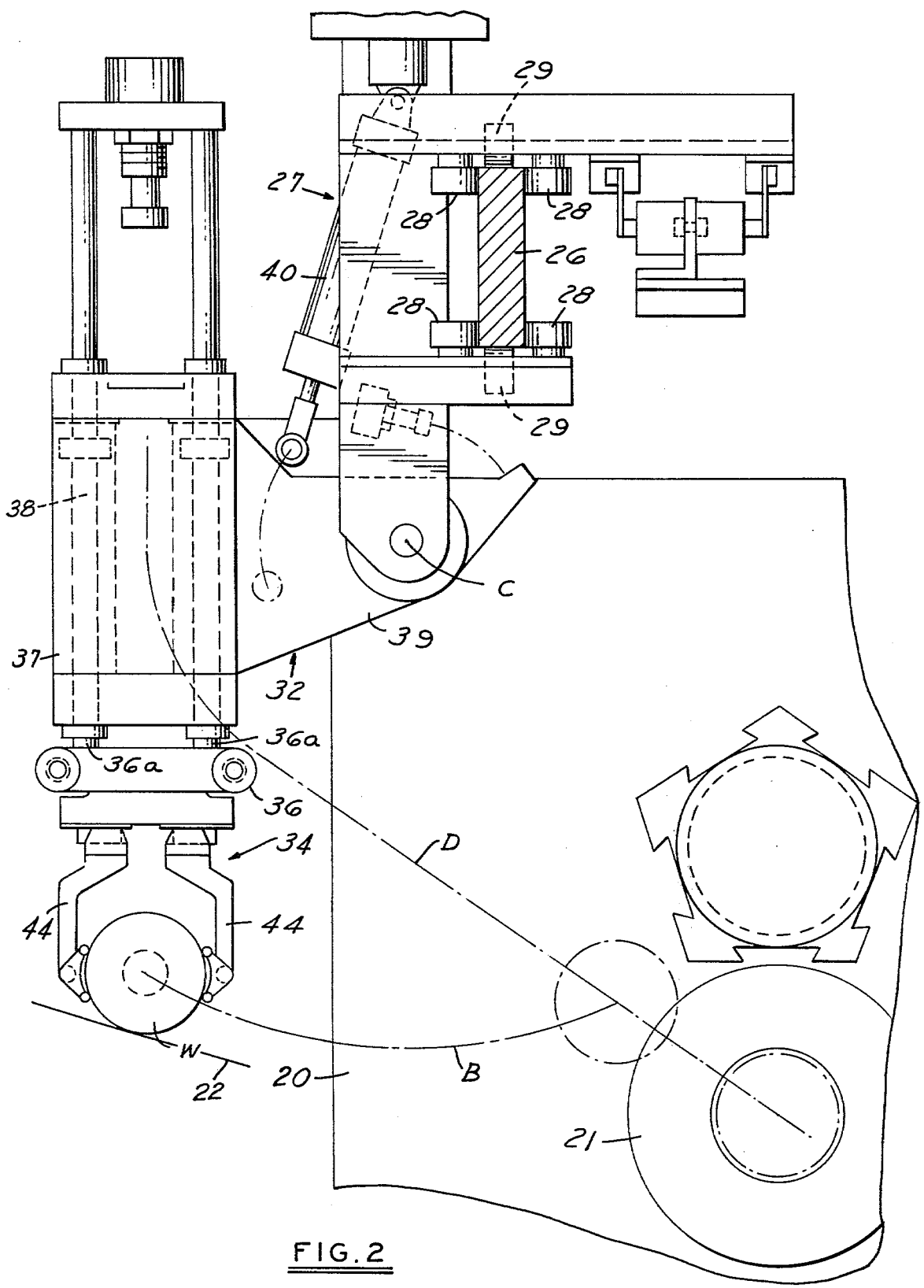
FIG. 2 is a fragmentary sectional view on an enlarged scale taken along the line 2—2 in FIG. 1.

More specifically, as shown in FIG. 2, each head 34 or 35 is mounted on a secondary frame 36 mounted on shafts 36a that is reciprocable radially on a main frame 37 by operation of a cylinder 38. The main frame 37 in turn has a bracket 39 pivoted about the axis C on the trolley 27. A cylinder 40 is adapted to swing the frame 37 and in turn the head in the direction of the arrow B.

Figure 5:
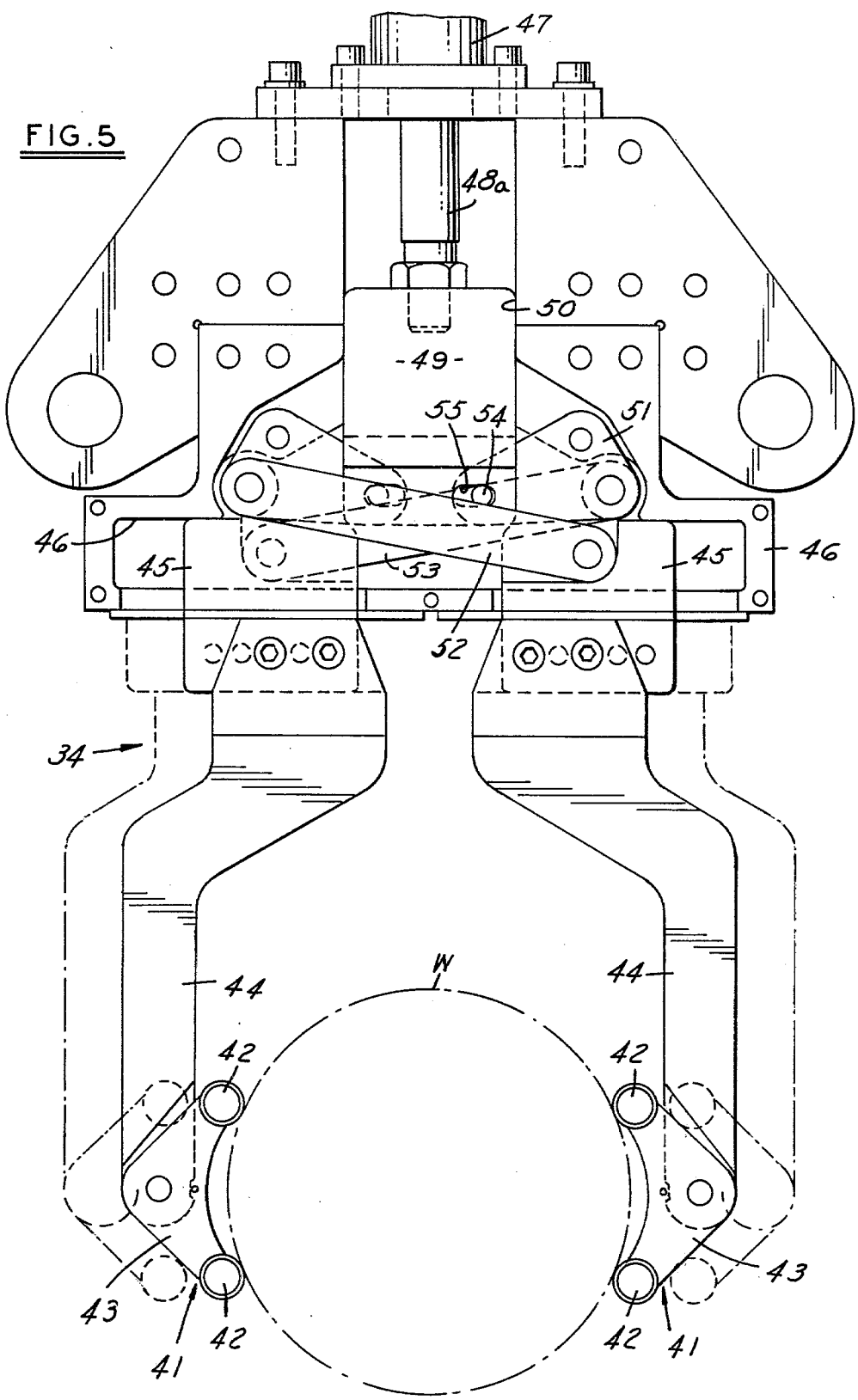
FIG. 5 is a fragmentary view on an enlarged scale of the loading head.

Referring to FIG. 5, the loader head 34 comprises opposed fingers 41 which are movable in a linear path toward and away from one another to grip and release a workpiece W. Each finger 41 comprises spaced rollers 42 rotatably mounted on plates 43 which, in turn are pivoted to clamp legs 44. Clamp legs 44 are selectively mounted in one of plurality of positions on slides 45 that are slidable in a linear slide way formed by the halves of body 46 of the head. Movement of the slides 45 toward and away from one another causes the clamp legs 44 and, in turn, fingers 41 to move toward and away from a workpiece.

Movement of the slides 45 is provided by a linear actuator 47 such as a hydraulic cylinder mounted on body 46 and having its shaft 48a connected to slides 45 by a push-pull linkage. Specifically this linkage comprises a push-pull block 49 slidable in a slide way 50 in body 46 at a right angle to the slide way. Bell cranks 51 are pivoted to body. The bell cranks 51 are pivoted to block 49 by pins 54 on block 49 which extend through slots 55 in the cranks 51. The slots 55 extend transversely of the axis of shaft 48a. The bell cranks 51 are connected to opposite slides 45 by crossed links 52, 53. When the shaft 48a of actuator is moved downwardly as viewed in FIG. 5, the bell cranks are swung to move slides 45 toward one another thereby moving clamp arms 44 and, in turn, fingers 41 to a workpiece gripping position.

Figure 6:
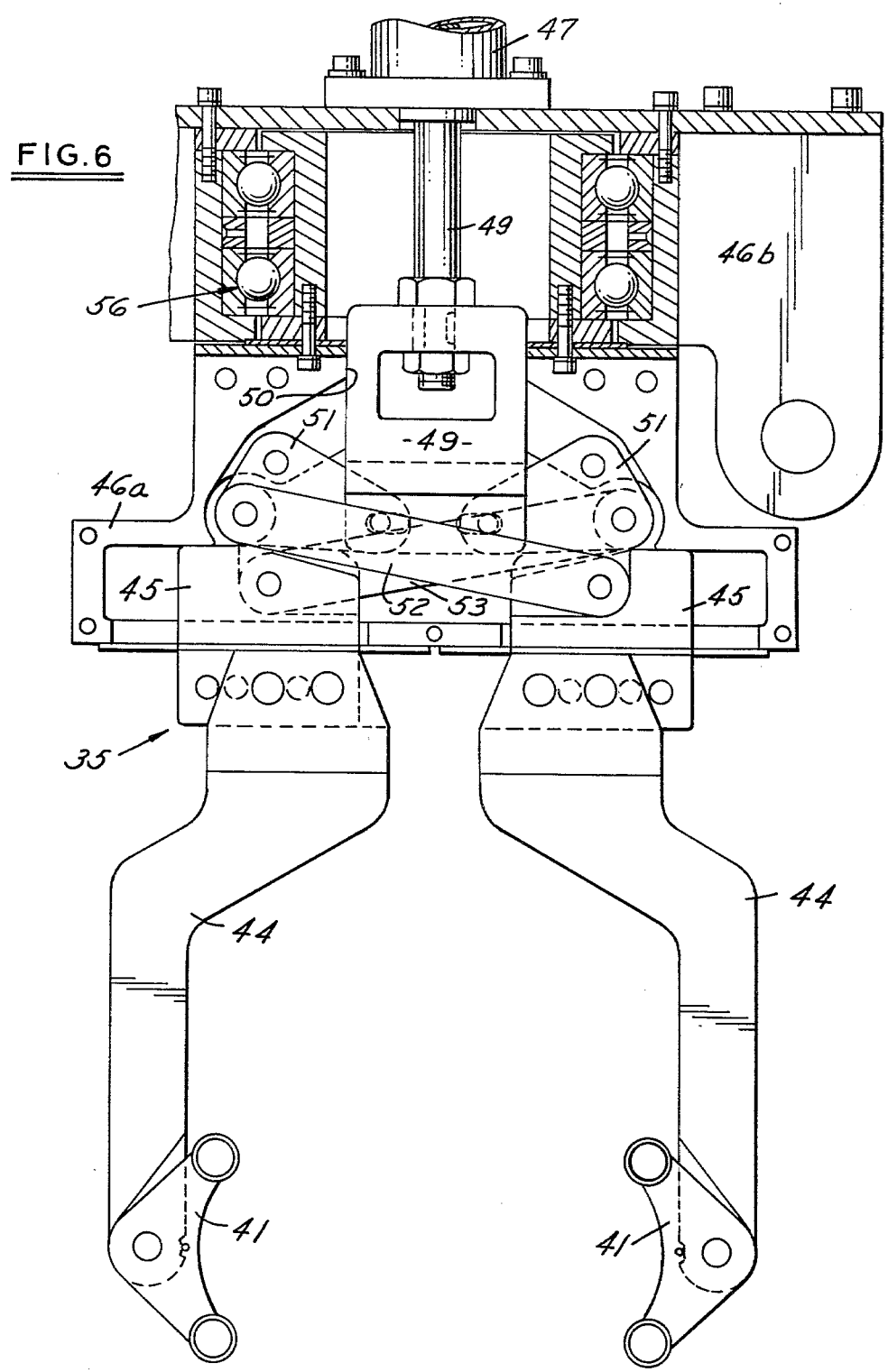
FIG. 6 is a view similar to FIG. 5 of the unloading head.

Referring to FIG. 6, the unloader head 35 is preferably provided with means to permit the unloading of a workpiece, rotation thereof 180° and reinsertion in the machine tool for further machining of the opposite face of the workpiece W. This is achieved by the construction shown in FIG. 6 wherein the head comprises a first body section 46a on which clamp legs and the linkage are mounted. First section 46a is rotatably mounted on a second section 46b of the head by bearings 56. A combined rotary and linear actuator 57 is mounted on the second fixed section 46b and is drivingly connected to rotate the shaft 48b and, in turn, the first section 46a relative to the second section 46b. The shaft 48b extends to the block 49 and is reciprocable, as is the form described above, to actuate the linkage and move the fingers toward and away from one another.

In operation, the workpieces W are moved along the chute 22 into position and then the loading head 34 is brought into position for picking up the workpiece by reciprocating movement of the trolley 27 and swinging and reciprocal movement of the head to pick up the workpiece W. The workpiece W is then swung to the position shown in FIG. 2 and then reciprocated to bring its axis in alignment with the axis A for engagement with the chuck.

The head 34 is then swung out of position and retracted so that various machining operations can be performed. After the machining operations are performed, the trolley 27 is moved longitudinally and the unloading head 35 is swung into position and extended axially with respect to the frame 37 to pick up the workpiece from the chuck. The head 35 is then swung back into position and retracted, and the head 35 is moved to position wherein the workpiece can be deposited on the unloading chute 23.

While the workpiece is being deposited on the unloading chute, the head 34 can also be extended and swung into position for picking up a work piece on the loading chute. This is achieved by having the spacing between the loading assembly 32 and unloading assembly 33 equal to the longitudinal spacing between the chutes 22, 23.

After picking up a workpiece, the loading assembly is then operated to bring the head 34 into position for depositing the new workpiece in the chuck and the cycle continues after each machining operation.

If desired, the unloading head 35 can be rotated after it picks up the workpiece W from the chuck and the workpiece reinserted into the chuck for an additional operation.

I claim:

1. A loader-unloader system for loading and unloading workpieces into a machine tool wherein each workpiece is held in position for rotation about a longitudinal axis by a chuck during which various machine operations may be performed by the tool comprising
a loading conveyor adapted to deliver articles in succession to a loading position,
an unloading conveyor adapted to receive workpieces,
a loader-unloading assembly comprising
means defining a track extending along an axis parallel to the longitudinal axis of the machine,
a trolley movable along said track means,
means for moving said trolley back and forth along said track means,
a load clamping head assembly mounted on said trolley,
an unload clamping head assembly mounted on said trolley,
each said assembly including a head for gripping a workpiece,
means on said trolley for mounting said head for swinging movement into and out of position adjacent said chuck and for reciprocating movement toward and away from the axis of said chuck,
each said head comprising sets of fingers,
means for mounting said fingers on said head for linear movement radially toward and away from one another for gripping and releasing a workpiece,
and means for moving said fingers toward and away from one another in said linear path,
said means for mounting said fingers comprising a clamp leg on which each finger is mounted, a slide on which each said leg is mounted, each slide being movable in a slide way in said head,
said means for moving said fingers comprising a linear actuator on said head and having an operating member and linkage means interconnecting said operating member of said actuator and said slides,
said linkage means comprising a block slideable in a block slide in said head and connected to said operating member of said actuator, a pair of bell cranks pivoted on said head and pivoted to said block, and a pair of crossed links pivoted to opposed bell cranks and said slides.

2. A loader-unloader system for loading and unloading workpieces into a machine tool wherein each workpiece is held in position for rotation about a longitudinal axis by a chuck during which various machine operations may be performed by the tool comprising
a loading conveyor adapted to deliver articles in succession to a loading position,
an unloading conveyor adapted to receive workpieces,
a loader-unloader assembly comprising
means defining a track extending along an axis parallel to the longitudinal axis of the machine,
a trolley movable along said track means,
means for moving said trolley back and forth along said track means,
a load clamping head assembly mounted on said trolley,
an unload clamping head assembly mounted on said trolley,
each said assembly including a head for gripping a workpiece,
means on said trolley for mounting said head for swinging movement into and out of position adjacent said chuck and for reciprocating movement toward and away from the axis of said chuck,
each said head comprising sets of fingers,
means for mounting said fingers on said head for linear movement radially toward and away from one another for gripping and releasing a workpiece,
and means for moving said fingers toward and away from one another in said linear path,
means associated with one of said heads for rotating said head about an axis at a right angle to the axis of the workpiece being loaded such that a workpiece in the machine tool can be gripped, removed from the machine tool, rotated and re-inserted in the machine tool to permit machining of an opposite surface thereof.

3. A loader-unloader system for loading and unloading workpieces into a machine tool wherein each workpiece is held in position for rotation about a longitudinal axis by a chuck during which various machine operations may be performed by the tool comprising
a loader-unloader assembly comprising
means defining a track extending along an axis parallel to the longitudinal axis of the machine,
a trolley movable along said track means, means for moving said trolley back and forth along said track means, a load clamping head assembly mounted on said trolley, an unload clamping head assembly mounted on said trolley, each said assembly including a head for gripping a workpiece, and means on said trolley for mounting said clamping head for swinging movement into and out of position adjacent said head and for reciprocating movement toward and away from the axis of said head, each said head comprising sets of fingers, means for mounting said fingers on said head for linear movement radially toward and away from one another for gripping and releasing a workpiece, and means for moving said fingers toward and away from one another in said linear path, said means for moving said fingers comprising push-pull means operable to move said fingers, said means for mounting said fingers comprising a clamp leg on which each finger is mounted, a slide on which each said leg is mounted, each slide being movable in a slide way in said head, said means for moving said fingers comprising a linear actuator on said head and having an operating member and linkage means interconnecting said operating member of said actuator and said slides, said linkage means comprising a block slideable in a block slide in said head and connected to said operating member of said actuator, a pair of bell cranks pivoted on said head and pivoted to said block, and a pair of crossed links pivoted to opposed bell cranks and said slides.

4. A loader-unloader system for loading and unloading workpieces into a machine tool wherein each workpiece is held in position for rotation about a longitudinal axis by a chuck during which various machine operations may be performed by the tool comprising a loader-unloader assembly comprising means defining a track extending along an axis parallel to the longitudinal axis of the machine, a trolley movable along said track means, means for moving said trolley back and forth along said track means, a load clamping head assembly mounted on said trolley, an unload clamping head assembly mounted on said trolley, each said assembly including a head for gripping a workpiece, and means on said trolley for mounting said clamping head for swinging movement into and out of position adjacent said head and for reciprocating movement toward and away from the axis of said head, each said head comprising sets of fingers, means for mounting said fingers on said head for linear movement radially toward and away from one another for gripping and releasing a workpiece, and means for moving said fingers toward and away from one another in said linear path, said means for moving said fingers comprising push-pull means operable to move said fingers, means associated with one of said heads for rotating said head about an axis at a right angle to the axis of the workpiece being loaded such that a workpiece in the machine tool can be gripped, removed from the machine tool, rotated and re-inserted in the machine tool to permit machining of an opposite surface thereof.

5. A load-unload head for loading and unloading a workpiece from a machine tool comprising a body, a set of fingers, means for mounting said fingers on said head for linear movement radially toward and away from one another for gripping and releasing a workpiece, and means for moving said fingers toward and away from one another in said linear path, said means for mounting said fingers comprising a clamp leg on which each finger is mounted, a slide on which each said leg is mounted, each slide being movable in a slide way in said head, said means for moving said fingers comprising a linear actuator on said head and having an operating member and linkage means interconnecting said operating member of said actuator and said slides, said linkage means comprising a block slideable in a block slide in said head and connected to said operating member of said actuator, a pair of bell cranks pivoted on said head and pivoted to said block, and a pair of crossed links pivoted to opposed bell cranks and said slides.

6. A load-unload head for loading and unloading a workpiece into a machine tool wherein each workpiece is held in position for rotation about a longitudinal axis comprising a body, a set of fingers, means for mounting said fingers on said head for linear movement radially toward and away from one another for gripping and releasing a workpiece, and means for moving said fingers toward and away from one another in said linear path, means associated with said head for rotating said head about an axis at a right angle to the axis of the workpiece being loaded said means for rotating being such that a workpiece in the machine tool can be gripped, removed from the machine tool, rotated and re-inserted in the machine tool to permit machining of an opposite surface thereof.

7. A loader-unloader system for loading and unloading workpieces into a machine tool wherein each workpiece is held in position for rotation about a longitudinal axis by a chuck during which various machine operations may be performed by the tool comprising a loading conveyor adapted to deliver articles in succession to a loading position, an unloading conveyor adapted to receive workpieces, a loader-unloader assembly comprising means defining a track extending along an axis parallel to the longitudinal axis of the machine, a trolley movable along said track means, means for moving said trolley back and forth along said track means, a load clamping head assembly mounted on said trolley, an unload clamping head assembly mounted on said trolley, each said assembly including a head for gripping a workpiece, means on said trolley for mounting said head for swinging movement into and out of position adjacent said chuck and for reciprocating movement toward and away from the axis of said chuck, each said head comprising sets of fingers, a clamp leg on which each finger is mounted, at least one said finger pivoted to a leg, each said finger comprising spaced workpiece contacts, and means for moving said legs toward and away from one another in a linear path.

8. The system set forth in claim 7 wherein each said contact comprises a roller.

9. A loader-unloader system for loading and unloading workpieces into a machine tool wherein each workpiece is held in position for rotation about a longitudinal axis by a chuck during which various machine operations may be performed by the tool comprising
a loader-unloader assembly comprising
means defining a track extending along an axis parallel to the longitudinal axis of the machine,
a trolley movable along said track means,
means for moving said trolley back and forth along said track means,
a load clamping head assembly mounted on said trolley,
an unload clamping head assembly mounted on said trolley,
each said assembly including a head for gripping a workpiece,
and means on said trolley for mounting said clamping head for swinging movement into and out of position adjacent said head and for reciprocating movement toward and away from the axis of said head,
each said head comprising sets of fingers,
a clamp leg on which each finger is mounted,
at least one said finger pivoted to a leg,
each said finger comprising spaced workpiece contacts,
and means for moving said legs toward and away from one another in a linear path.

10. The system set forth in claim 9 wherein each said contact comprises a roller.

11. A load-unload head for loading or unloading a workpiece from a machine tool comprising
a body,
a pair of clamp legs,
means for moving said clamp legs toward and away from one another in a linear path,
a finger associated with each said clamp leg,
at least one of said fingers being pivoted to a leg,
each said finger comprising spaced workpiece contacts, wherein each said contact comprises a roller.

12. A loader-unloader system for loading and unloading workpieces into a machine tool wherein each workpiece is held in position for rotation about a longitudinal axis by a chuck during which various machine operations may be performed by the tool comprising
a loading conveyor adapted to deliver articles in succession to a loading position,
an unloading conveyor adapted to receive workpieces,
a loader-unloader assembly comprising
means defining a track extending along an axis parallel to the longitudinal axis of the machine,
a trolley movable along said track means,
means for moving said trolley back and forth along said track means,
a load clamping head assembly mounted on said trolley,
an unload clamping head assembly mounted on said trolley,
each said assembly including a head for gripping a workpiece,
means on said trolley for mounting said head for swinging movement into and out of position adjacent said chuck and for reciprocating movement toward and away from the axis of said chuck,
each said head comprising sets of fingers,
means for mounting said fingers on said head for linear movement radially toward and away from one another for gripping and releasing a workpiece,
and means for moving said fingers toward and away from one another in said linear path,
said means for mounting said fingers comprising a clamp leg on which each finger is mounted, a slide on which each said leg is mounted, each slide being movable in a slide way in said head,
said means for moving said fingers comprising a linear actuator on said head and having an operating member and linkage means interconnecting said operating member of said actuator and said slides.

13. A loader-unloader system for loading and unloading workpieces into a machine tool wherein each workpiece is held in position for rotation about a longitudinal axis by a chuck during which various machine operations may be performed by the tool comprising
a loader-unloader assembly comprising
means defining a track extending along an axis parallel to the longitudinal axis of the machine,
a trolley movable along said track means,
means for moving said trolley back and forth along said track means,
a load clamping head assembly mounted on said trolley,
an unload clamping head assembly mounted on said trolley,
each said assembly including a head for gripping a workpiece,
and means on said trolley for mounting said clamping head for swinging movement into and out of position adjacent said head and for reciprocating movement toward and away from the axis of said head,
each said head comprising sets of fingers,
means for mounting said fingers on said head for linear movement radially toward and away from one another for gripping and releasing a workpiece,
and means for moving said fingers toward and away from one another in said linear path,
said means for mounting said fingers comprising a clamp leg on which each finger is mounted, a slide on which each said leg is mounted, each slide being movable in a slide way in said head,
said means for moving said fingers comprising a linear actuator on said head and having an operating member and linkage means interconnecting said operating member of said actuator and said slides.

14. A load-unload head for loading and unloading a workpiece from a machine tool comprising a body,
a set of fingers,
means for mounting said fingers on said head for linear movement radially toward and away from one another for gripping and releasing a workpiece,
and means for moving said fingers toward and away from one another in said linear path,
said means for mounting said fingers comprising a clamp leg on which each finger is mounted, a slide on which each said leg is mounted, each slide being movable in a slide way in said head,
said means for moving said fingers comprising a linear actuator on said head and having an operating member and linkage means interconnecting said operating member of said actuator and said slides.

* * * * *